(No Model.)
T. LEACH.
Baking Dish.
No. 234,790. Patented Nov. 23, 1880.
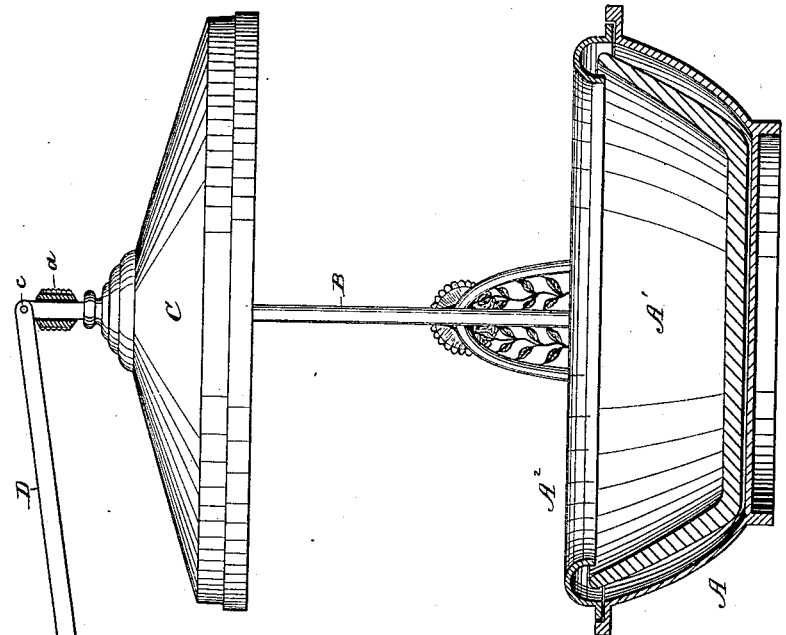
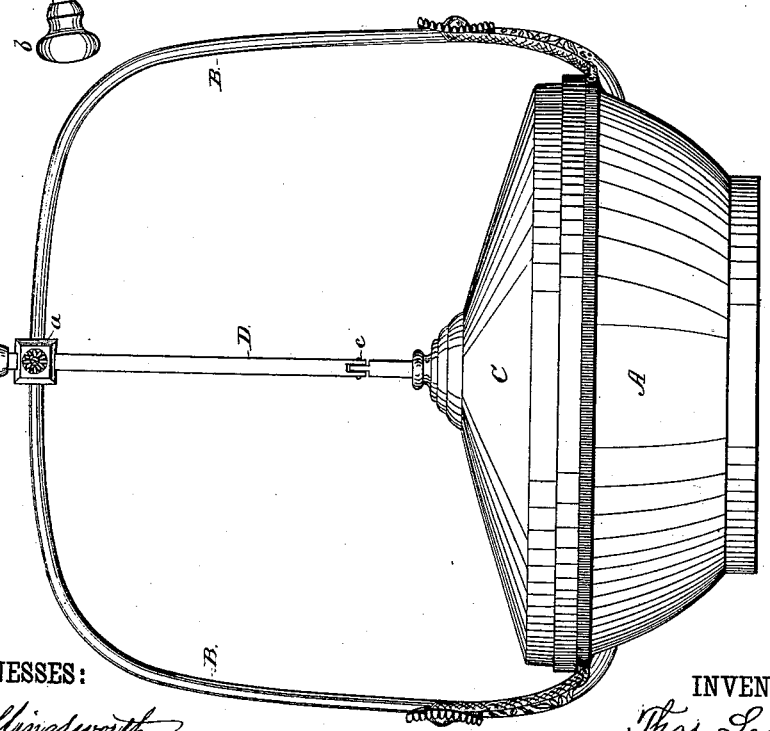
WITNESSES:
W. W. Hollingsworth
Edw. W. Byrn.
INVENTOR:
Thos. Leach
BY
ATTORNEYS.

UNITED STATES PATENT OFFICE.

THOMAS LEACH, OF TAUNTON, MASSACHUSETTS, ASSIGNOR TO REED & BARTON, OF SAME PLACE.

BAKING-DISH.

SPECIFICATION forming part of Letters Patent No. 234,790, dated November 23, 1880.

Application filed May 15, 1880. (No model.)

*To all whom it may concern:*

Be it known that I, THOMAS LEACH, of Taunton, in the county of Bristol and State of Massachusetts, have invented a new and Improved Baking-Dish; and I do hereby declare that the following is a full, clear, and exact description of the same, reference being had to the accompanying drawings, forming part of this specification, in which—

Figure 1 is a side elevation with the cover closed down over the dish. Fig. 2 is a view at right angles to Fig. 1, showing the cover raised and the dish in section.

My invention relates to an improvement in baking-dishes applicable to all kinds of analogous covered dishes, such as pickle-casters, jewel-cases, sugar or butter dishes, &c. It is in the nature of novel means for maintaining the cover of the dish in suspended position above the subjacent receptacle; and it consists in a stem rising centrally from the cover and passing through a tube, sleeve, or hole in the arched handle, which stem is provided in its length with an articulated joint, so that after the cover has been lifted and the articulation in the stem has passed through the sleeve in the handle the upper section may be deflected upon the joint into a right-angular position, so as to maintain the cover raised.

In the drawings, A represents the outer receptacle of a baking-dish, whose porcelain or earthenware body A' is made detachable and adapted to be placed in the stove, and which, when inserted in the dish A, has its edge covered by a ring, A², before being placed on the table.

B is an arched handle attached to the part A and rising above the cover. This handle is provided in its center with a tube, sleeve, or opening, $a$.

C is the cover, to which is centrally attached the stem D, which passes through the sleeve or opening $a$ and terminates above the same in a knob, $b$.

A little below the middle of this stem is formed an articulating joint, $c$, adapted to pass through the sleeve or opening above. Now, in raising and sustaining the cover, it will be seen that it is only necessary to lift the stem D by its knob, and, after the joint has passed through the sleeve or opening in the handle, to bend the stem down into a horizontal position, where it balances the cover and sustains the latter in its raised position. When the stem is made round the cover has free movement to turn on its central vertical axis to bring the handle in reach.

I am aware of the fact that it is not new to raise and sustain the cover of a vessel by means of a vertical stem and sleeve, and I only claim, therefore, the articulated stem in this connection.

Having thus described my invention, what I claim as new is—

In a covered dish, the cover provided with a vertical stem having an articulated joint therein, in combination with the overhanging handle having a sleeve or opening through which the said stem passes, as and for the purpose described.

THOMAS LEACH.

Witnesses:
F. E. FISKE,
CHAS. E. HODGES.